3,692,491
COMPLEMENT FIXATION TESTING TRAY
Elmer F. Trentelman, Miami, Fla., assignor to American Hospital Supply Corporation, Evanston, Ill.
Filed June 30, 1971, Ser. No. 158,446
Int. Cl. C12b 1/08; C12k 1/10; G01n 33/16
U.S. Cl. 23—253 R      8 Claims

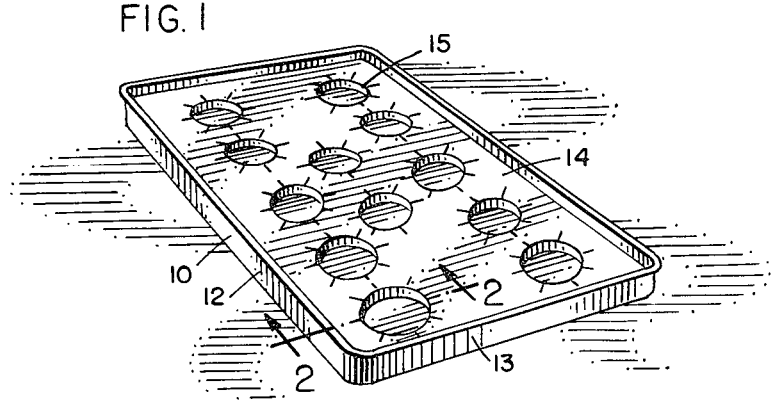
FIG. 1
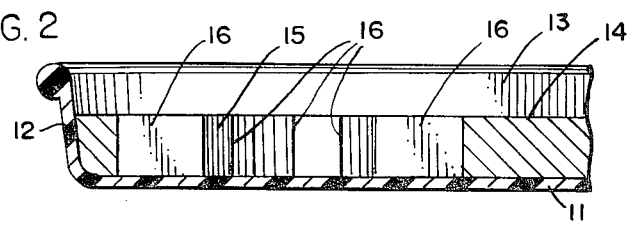
FIG. 2
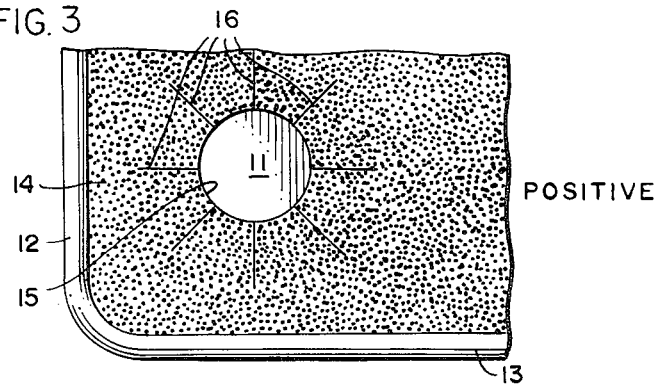
FIG. 3 POSITIVE
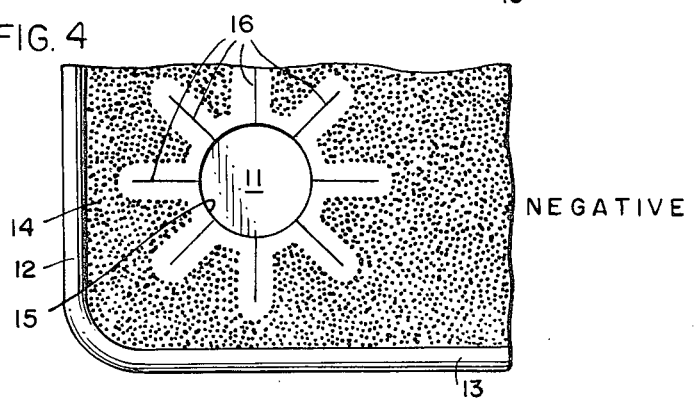
FIG. 4 NEGATIVE
INVENTOR:
ELMER F. TRENTLEMAN
BY
Dawson, Tilton, Falloy & Lungmus
ATT'YS United States Patent Office 3,692,491
Patented Sept. 19, 1972

ABSTRACT OF THE DISCLOSURE

An agar-containing tray for use in a complement fixation testing procedure for visually determining whether a sample of body fluid contains a given antigen or antibody. Sensitized animal (sheep) red cells (hemolysin-sheep red blood cell complex) are embedded in the agar medium. Wells are provided in the agar layer, each of the wells having a plurality of slits radiating therefrom. When the test results are negative, indicating the absence of the given antibody or antigen in the fluid introduced into a well, hemolysis occurs along the margins of the slits and about the border of the well to produce a readily observable sunburst design.

BACKGROUND

As reported by C. S. Knepp, C. N. Coleman and N. R. Shulman in Clinical Research, volume 18, No. 2, p. 442 (April 1970), a complement fixation test for hepatitis associated antigen, sometimes referred to as Australia Antigen, is both fast and effective. A patient's serum suspected of containing the Australia Antigen is first mixed with a test reagent containing a standard antibody capable of complexing with the antigen and also containing one to two units of complement. If the antigen is present, an antigen-antibody complex will be formed and the complement will become bound or fixed (and inactivated for purposes of the test) to the complex. On the other hand, if the antigen is not present then no complex will be formed and the complement will remain available and active.

In the second stage of the reported procedure, the test sample (containing serum to which the complement-antibody reagent has been added) is placed within a well formed in agar gel containing sensitized sheep red cells. If the red cells are lysed by the complement, then obviously the complement has remained active after the first stage, indicating that the patient's serum contained no Australia Antigen. Conversely, should no lysis occur, then it is apparent that the complement has become bound to the Australia Antigen-Anti-Australia Antigen complex, indicating that the patient's serum contained the antigen.

Complement fixation is a well known testing procedure and may be used for detecting the presence of any of a variety of antigens and antibodies in body fluids. However, while such a procedure is relatively fast and sensitive, it is in many cases difficult to ascertain by visual inspection whether the results are positive or negative. Thus, as reported by Knepp et al., supra, the observable difference between positive and negative results is that in the latter a band or halo having a width of 2 millimeters appears about the well. In practice, the halo of clear material may be so difficult to detect that an erroneous reading of the results might readily occur, possibly leading to an incorrect diagnosis of a patient's condition and perhaps serious consequences that could result therefrom.

SUMMARY

A main object of this invention is to provide a complement fixation testing tray which overcomes the aforementioned problem. Specifically, it is an object to provide a tray containing agar gel which is adapted to receive samples of serum previously treated with complement and with an antibody or antigen, and which is so constructed that visual differentiation between positive and negative test results may be easily and definitely made.

The tray is characterized by having a plurality of slits in the agar which communicate with individual wells formed therein. Normally such slits are practically invisible; however, should the results of the test be negative, then hemolysis occurring along the margins of such slits makes such marginal portions distinctively different in appearance. In the preferred form, where such slits extend radially from each well, hemolysis produces the appearance of relatively clear rays or bands emanating from the well. The sunburst appearance is so readily observable that the usual difficulties in distinguishing between negative and positive results are greatly reduced or eliminated.

DRAWINGS

FIG. 1 is a perspective view of a complement fixation testing tray embodying the invention;

FIG. 2 is an enlarged fragmentary vertical cross sectional view taken along line 2—2 of FIG. 1;

FIG. 3 is an enlarged fragmentary top plan view of the tray, the agar being shaded to suggest its appearance when the results of the test are positive;

FIG. 4 is a fragmentary top plan view similar to FIG. 3, the agar being shaded to indicate its appearance when the results of a test are negative.

DESCRIPTION

In the embodiment illustrated in the drawings, the numeral 10 generally designates an open-topped complement fixation testing tray having integral bottom, side, and end walls 11–13, respectively. The tray contains a layer of agar gel 14. Embedded within the agar gel are sensitized sheep erythrocytes, such erythrocytes or red cells having been sensitized with a rabbit anti-sheep hemolysin (antibody), all as well known in the art, and as disclosed in the Knepp et al publication, supra. The red cells give the agar a reddish color throughout, such color being represented for purposes of illustration by the stippling in FIGS. 3 and 4.

The agar layer is provided with a plurality of wells 15. While a total of 12 such wells are illustrated in FIG. 1, it will be understood that the tray may be provided with a greater or smaller number as desired. Each well is preferably circular in shape and may, as indicated in the drawings, extend completely through the agar layer. Alternatively, each well may simply constitute a depression in the agar layer without extending completely therethrough.

The agar gel is conventional in composition except that it contains an evenly-distributed quantity of sensitized animal erythrocytes embedded therein. Such cells give the agar a uniform reddish color. While the concentration of the cells may vary widely according to the preference of the user, the 0.5 percent concentration referred to in the Knepp et al. article, supra, has been found satisfactory. The animal red cells, normally sheep erythrocytes, must be sensitized with a substance that will react with complement to produce lysis of the cells. Where sheep red cells are used, the sensitizing substance may be rabbit anti-sheep hemolysis (antibody), all as well known in the art.

Referring particularly to FIGS. 3 and 4, it will be observed that a plurality of slits 16 radiate from each of the wells. The slits or cuts are formed in the agar without removing any appreciable amount of material; hence, such slits are difficult to see under normal circumstances. They have been depicted clearly in the drawings only for purposes of illustration. The slits communicate with each well at circumferentially spaced points thereabout. In the illustration given, the slits extend outwardly along radial lines although variations of that pattern may also be suitable. Similarly, the slits are shown in FIG. 2 to extend completely through the agar layer but it will be appreciated that the depth of such slits will correspond generally to the depth of the well. Thus, where a shallow well is formed, the communicating slits may be correspondingly shallow.

In a complement testing procedure, as already indicated, a fluid sample containing a specimen of body fluid (serum or plasma) and also containing complement and an antibody (or antigen) capable of complexing with an antibody (or antigen) suspected of being present in the fluid, is placed within a well 11. The liquid is relatively clear and does not produce an immediate change in the appearance of the testing tray. However, upon incubation at approximately 37 degrees C. for an hour or more, the complement, if it has not already been fixed to the antigen-antibody complex in the earlier stage of the test, will have reacted with red cells in the agar along the border of the well and along the margins of the slits which communicate with that well. Lysis of the cells contacted by the complement results in clear zones and produces the distinctive sunburst pattern indicated in FIG. 4. While lysis of the cells in the narrow band about the circular border of the well may not be readily detectable, lysis along the margins of the slits gives a clear and unmistakable indication of a negative test.

Since complement fixation testing is well known, a more complete discussion of the mechanism of the test is believed unnecessary. The term "complement" is applied to a system of factors occurring in normal serum that are activated characteristically by antigen-antibody interaction and subsequently mediate a number of biologically significant consequences (Molecular Basis of Complement Action, H. J. Rapp and T. Borsos, 1970).

As suggested above, the composition of the agar medium may vary considerably. Similarly, the tray may vary in size and construction. However, for purposes of illustration, one specific embodiment is described in greater detail in the following example.

EXAMPLE

A shallow tray is used having the general configuration illustrated in FIG. 1 and having the following approximate dimensions: length 4 inches, width 2 inches, height 0.4 inch. Each well is approximately 0.3 (8 mm.) of an inch in diameter. The slits radiated outwardly from each well approximately ¼ of an inch with a total of 8 slits for each well.

To prepare the agar composition, the following reagents are combined in the ratios given and dissolved by boiling:

| | Amount, ml. | Final concentration |
|---|---|---|
| Sodium chloride 0.9% | 1,000.0 | 0.9%. |
| Sorenson's phosphate buffer 1 molar, pH 7.4 | 1.0 | 0.001 molar. |
| Calcium chloride 0.15 molar | 1.0 | 0.00015 mola |
| Magnesium chloride 0.5 molar | 1.0 | 0.0005 molar. |
| Purified agar (Ion Agar No. 3, Colab; or Difco Purified; or B&L Agarose). | 8.0 | 0.8%. |

After complete solution of the ingredients, the preparation is sterilized. This may be accomplished by autoclave (steam) sterilization for 20 minutes at 125° C. or by passage through a bacteria excluding filter. The sterile preparation is cooled to 46–48° C. in a constant temperature water bath and the following ingredients added and mixed to a uniform suspension:

| | Amount | Final concentration |
|---|---|---|
| Sterile actidione 1% | 10.0 ml | 0.01%. |
| Sterile neomycin sulfate | 0.3 grams | 0.03%. |
| Sterile anti-sheep hemolysin | 2,000 units | 2 units per ml. |
| Sterile sheep red blood cells 20% in Alsevers solution. | 25.0 ml | 0.5%. |

With aseptic precautions the prepared blood agar is dispensed into plastic trays to a depth of 1.8 mm.±0.1 mm. The filled trays are maintained on a horizontal surface until the agar has solidified. Preferably the filled plates are stored overnight at 2–8° C. before cutting of the wells and slits.

While in the foregoing I have disclosed an embodiment of the invention in considerable detail for purposes of illustration, it will be understood that many of such details may be varied considerably without departing from the spirit and scope of the invention.

I claim:

1. An open-topped tray for complement fixation testing, said tray containing a layer of agar gel having at least one well formed therein and having a plurality of slits extending outwardly from and communicating with said well, said agar having sensitized red blood cells embedded therein and normally having color imparted thereto by said cells, the agar along the peripheral margin of said well and along the margins of said slits losing said color to produce a sunburst design in said agar when the cells embedded therein are lysed by a complement-containing fluid placed in said well.

2. The tray of claim 1 in which said slits extend radially from said well.

3. The tray of claim 2 in which said slits are uniformly circumferentially spaced about the periphery of said well.

4. The tray of claim 3 in which there are at least six of said slits.

5. A tray for complement fixation testing, said tray having integral bottom, side, and end walls and containing therein a layer of agar gel, said layer having at least one well formed therein and a plurality of slits extending outwardly from and communicating with said well, said agar also having distributed uniformly therethrough a quantity of sensitized red blood cells normally imparting a reddish color to said agar, the agar along the peripheral margin of said well and along the margins of said slits losing said color to produce a contrasting sunburst design when the wells embedded therein are lysed by a complement-containing fluid placed in said well.

6. The structure of claim 5 in which said tray is formed of plastic material.

7. The structure of claim 5 in which said slits extend radially from said well.

8. The structure of claim 7 in which said slits are uniformly circumferentially distributed about said well.

References Cited

UNITED STATES PATENTS

| 3,065,150 | 11/1962 | Kravitz | 195—139 LE |
| 3,107,204 | 10/1963 | Brown et al. | 195—139 LE |
| 3,227,522 | 1/1966 | Salisbury, Jr. et al. | 23—283 R |

MORRIS O. WOLK, Primary Examiner

R. M. REESE, Assistant Examiner

U.S. Cl. X.R.

23—230 B; 195—139 LE